US011977628B2

(12) United States Patent
Nagaoka

(10) Patent No.: US 11,977,628 B2
(45) Date of Patent: May 7, 2024

(54) SEMICONDUCTOR DEVICE

(71) Applicant: FUJIFILM Business Innovation Corp., Tokyo (JP)

(72) Inventor: Tsutomu Nagaoka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 251 days.

(21) Appl. No.: 17/333,031

(22) Filed: May 28, 2021

(65) Prior Publication Data

US 2022/0108009 A1    Apr. 7, 2022

(30) Foreign Application Priority Data

Oct. 1, 2020 (JP) ................. 2020-167338

(51) Int. Cl.
*G06F 21/00* (2013.01)
*G06F 21/55* (2013.01)

(52) U.S. Cl.
CPC ...... *G06F 21/554* (2013.01); *G06F 2221/034* (2013.01)

(58) Field of Classification Search
None
See application file for complete search history.

(56) References Cited

U.S. PATENT DOCUMENTS

| 7,613,931 | B2* | 11/2009 | Tonami ................. G06F 9/4401 713/1 |
| 11,575,503 | B2 | 2/2023 | Ishigaya et al. |
| 11,630,895 | B2 | 4/2023 | Sidorov et al. |
| 2010/0125891 | A1* | 5/2010 | Baskaran ............ G06F 21/6218 726/4 |
| 2011/0145934 | A1 | 6/2011 | Abramovici et al. |

FOREIGN PATENT DOCUMENTS

| JP | 4191170 | 12/2008 |
| JP | 5246863 | 7/2013 |
| JP | 5514609 | 6/2014 |
| JP | 2020109645 | 7/2020 |
| WO | 2020100342 | 5/2020 |

OTHER PUBLICATIONS

Office Action of Japan Counterpart Application, with English translation thereof, issued on Mar. 19, 2024, pp. 1-6.

* cited by examiner

*Primary Examiner* — Andrew J Steinle
(74) *Attorney, Agent, or Firm* — JCIPRNET

(57) ABSTRACT

A semiconductor device includes: a detector that detects unauthorized access; and a reconfiguration unit that, in response to detection of the unauthorized access by the detector, reconfigures a reconfiguration area where a circuit that defines an operation was present to a state in which the circuit does not execute an operation based on the circuit.

20 Claims, 5 Drawing Sheets

SEMICONDUCTOR DEVICE

CROSS-REFERENCE TO RELATED APPLICATIONS

This application is based on and claims priority under 35 USC 119 from Japanese Patent Application No. 2020-167338 filed Oct. 1, 2020.

BACKGROUND

(i) Technical Field

The present disclosure relates to a semiconductor device.

(ii) Related Art

Japanese Patent No. 5246863 discloses a logic program data protection system for a reconfigurable logic device. The logic program data protection system for the reconfigurable logic device, which is disclosed in Japanese Patent No. 5246863, is a logic program data protection system for a reconfigurable logic device capable of configuring a circuit inside by downloading logic program data describing circuit configuration information from an external storage device. The reconfigurable logic device includes a fixed area where a fixed circuit is mounted, a logic area where logic and wiring are changeable by rewriting the contents of configuration memory, an internal storage that holds an identification (ID) unique to the device, and a key register that stores a secret key.

The logic area includes a control logic area that controls reconfiguration and that decrypts and verifies a bitstream, and a user logic area for configuring a user circuit. A configuration control circuit that obtains unencrypted logic program data from the external storage device and controls circuit configuration in the logic area is formed in the control logic area, thereby switchably mounting a key generation circuit, a decryption circuit, and a verification circuit in the control logic area.

The key generation circuit generates a secret key by performing arithmetic processing using the device unique ID stored in the internal storage, and stores the secret key in the key register.

The decryption circuit obtains encrypted logic program data of a user circuit from the external storage device, and decrypts the encrypted logic program data using the secret key in the key register.

The verification circuit is configured in the control logic area by obtaining encrypted or unencrypted logic program data from the external storage device, and verifies the integrity of the logic program data. In the case where the integrity of the decrypted logic program data is confirmed, the logic program data is sent to the configuration control circuit, and the logic program data is written in the configuration memory, thereby forming a user circuit in the user logic area.

Japanese Patent No. 5514609 discloses a tampering detection circuit. The tampering detection circuit disclosed in Japanese Patent No. 5514609 includes a first memory, a programmable logic device, a power supply unit, a terminal state detector, a second memory, and a controller.

The first memory stores in advance state definition information and circuit data. The state definition information is information for defining the state of a terminal of the programmable logic device. The state definition information indicates a terminal type representing which of an input terminal and an output terminal the terminal serves as, and indicates a terminal setting representing whether to pull up or pull down the terminal whose terminal type is the input terminal. The circuit data includes logic circuit information representing an inner logic circuit of the programmable logic device and is for driving the programmable logic device.

The programmable logic device loads the circuit data stored in the first memory to allow the terminal to enter a state indicated by the state definition information included in the circuit data. Also, the programmable logic device configures a logic circuit represented by the logic circuit information included in the circuit data to start an operation based on the configured logic circuit, thereby raising the pulled-up input terminal to a high level and lowering the pulled-down input terminal to a low level, and allowing the output terminal to reach a voltage level in accordance with an initial state of the configured logic circuit.

The power supply unit supplies drive power to the programmable logic device.

The terminal state detector is connected to the terminal and detects the state of the terminal in accordance with whether the terminal is at a high level or a low level.

The second memory stores in advance state information indicating whether the voltage level of the terminal is a high level or a low level, which serves as a state to be taken by the terminal immediately after the circuit data is loaded by the programmable logic device.

The controller determines whether the state of the terminal detected by the terminal state detector in a preset period after the supply of the drive power by the power supply unit is started is different from a state indicated by the state information stored in advance in the second memory; and, in a case where the state of the terminal detected by the terminal state detector is different from a state indicated by the state information stored in advance in the second memory, detects tampering of the circuit data stored in the first memory.

Japanese Patent No. 4191170 discloses a programmable gate array copy prevention method. The programmable gate array copy prevention method disclosed in Japanese Patent No. 4191170 is a programmable gate array (field-programmable gate array (FPGA)) copy prevention method. The programmable gate array copy prevention method includes the FPGA, read-only memory (ROM) that stores user circuit data and a first activation key code string, and a user-dedicated gate array (GA) with first activation key information embedded in advance. In a case where information derived from the first activation key code string matches the first activation key information, the GA boots the user circuit data into the FPGA.

A semiconductor device such as an FPGA may perform an operation different from its original operation when it is hacked by unauthorized access.

SUMMARY

Aspects of non-limiting embodiments of the present disclosure relate to providing a semiconductor device capable of avoiding performing an operation different from its original operation even in the event of unauthorized access.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a semiconductor device including: a detector that detects unauthorized access; and a reconfiguration unit that, in response to detection of the unauthorized access by the detector, reconfigures a reconfiguration area where a circuit that defines an operation was present to a state in which the circuit does not execute an operation based on the circuit.

BRIEF DESCRIPTION OF THE DRAWINGS

An exemplary embodiment of the present disclosure will be described in detail based on the following figures, wherein.

DETAILED DESCRIPTION

Exemplary Embodiment

Hereinafter, an exemplary embodiment of the present disclosure will be described.
Configuration of Exemplary Embodiment
Configuration of Semiconductor Device 1

Figure 1:
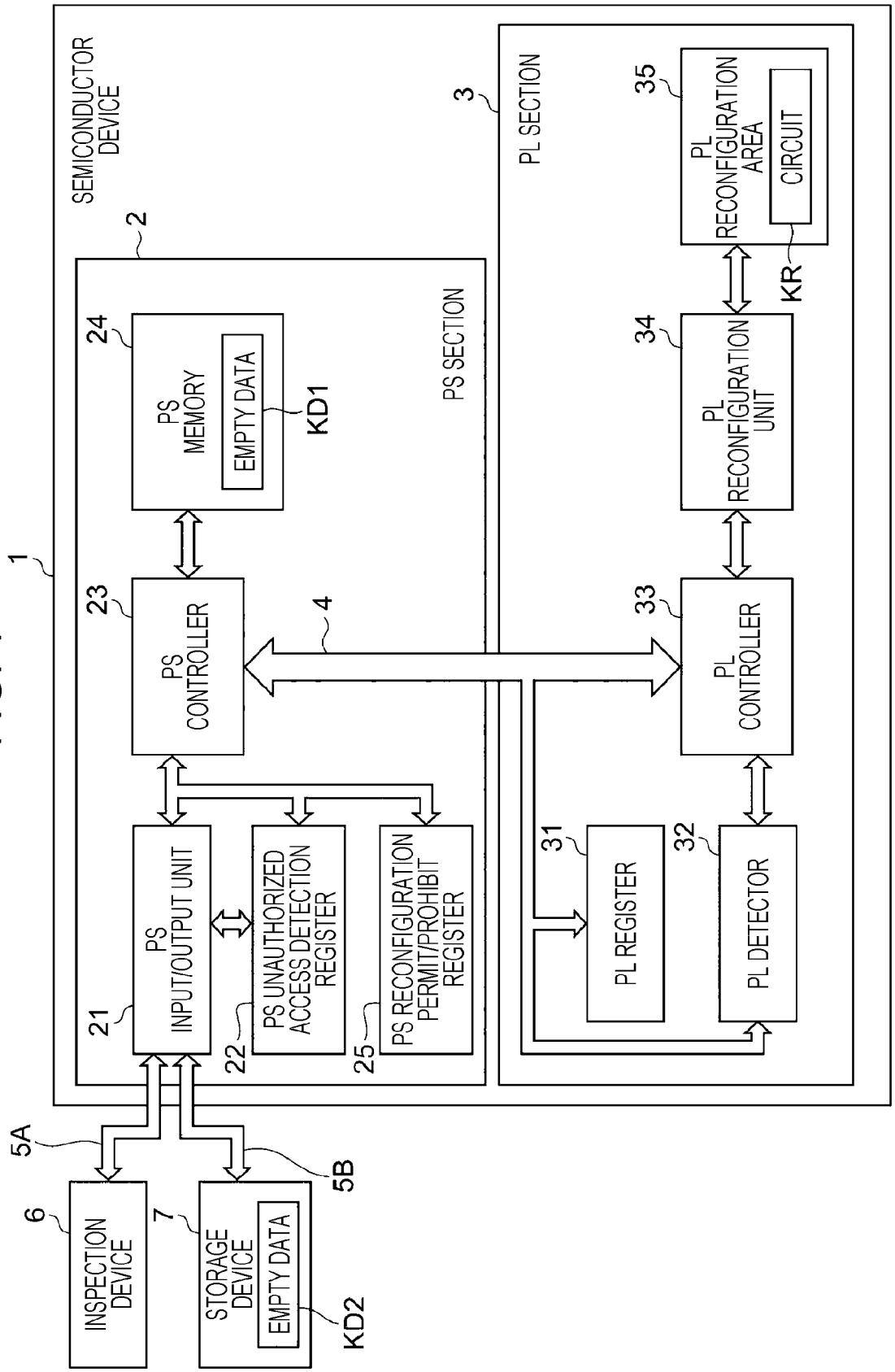
FIG. 1 illustrates the configuration of a semiconductor device of an exemplary embodiment.

FIG. 1 illustrates the configuration of a semiconductor device 1 of the exemplary embodiment. The configuration of the semiconductor device 1 of the exemplary embodiment will be described with reference to FIG. 1.

The semiconductor device 1 of the exemplary embodiment is such that a circuit KR is reconfigurable, and, as illustrated in FIG. 1, includes a processing system (PS) section 2 and a programmable logic (PL) section 3.

The PS section 2 and the PL section 3 are connected by an internal bus 4. The internal bus 4 is a bus that conforms to, for example, the Advanced eXtensible Interface (AXI) protocol.

The PS section 2 may be connected to an inspection device 6 via an external bus 5A. In addition, the PS section 2 may be connected to a storage device 7 via an external bus 5B.

The PS section 2 exchanges data with the PL section 3 via the internal bus 4. In addition, the PS section 2 exchanges data with the inspection device 6 via the external bus 5A. In addition, the PS section 2 exchanges data with the storage device 7 via the external bus 5B.

The PL section 3 reconfigures the above-mentioned circuit KR through the above-mentioned data exchange with the PS section 2.
Configuration of PS Section 2

The PS section 2 includes, as illustrated in FIG. 1, a PS input/output unit 21, a PS unauthorized access detection register 22, a PS controller 23, a PS memory 24, and a PS reconfiguration permit/prohibit register 25.

The PS input/output unit 21 may be connected to the inspection device 6 via the external bus 5A. In addition, the PS input/output unit 21 may be connected to the storage device 7 via the external bus 5B.

The inspection device 6 conforms to, for example, the Joint Test Action Group (JTAG) standard. At the stage of designing the semiconductor device 1, the inspection device 6 is used by a designer (not illustrated) to test or inspect the semiconductor device 1. In addition, at a stage after the mass production of the semiconductor device 1, the inspection device 6 may be used by a third person (not illustrated) to reverse-engineer the semiconductor device 1.

The storage device 7 is, for example, ROM, and stores in advance data (including empty data KD2) for reconfiguring the above-mentioned circuit KR. The empty data KD2 will be described later.

The PS unauthorized access detection register 22 is used for storing whether access from an external device outside the semiconductor device 1, such as the inspection device 6, to the semiconductor device 1 is unauthorized access.

Here, "unauthorized access" is access that differs from authorized access.

The PS controller 23 controls the overall operation of the PS section 2. In addition, the PS controller 23 respectively exchanges data for testing the semiconductor device 1 and data for reconfiguring the circuit KR with the inspection device 6 and the storage device 7 via the PS input/output unit 21 and the external buses 5A and 5B. Likewise, the PS controller 23 exchanges data for testing the semiconductor device 1 and data for reconfiguring the circuit KR with the PL controller 33 in the PL section 3 via the internal bus 4. The PS controller 23 further performs monitoring for detecting whether there is "unauthorized access".

The PS memory 24 is, for example, on-chip memory (OCM), and, like the storage device 7, stores in advance data (including empty data KD1) for reconfiguring the circuit KR. The empty data KD1 will be described later.

The PS reconfiguration permit/prohibit register 25 is a register for setting permission or prohibition of access from the PL section 3 to the PS section 2. The PS reconfiguration permit/prohibit register 25 is, specifically, a register for setting permission or prohibition of reconfiguration of some kind of circuit in the PL reconfiguration area 35 by the PS section 2.
Configuration of PL Section 3

The PL section 3 includes a PL register 31, a PL detector 32, the PL controller 33, a PL reconfiguration unit 34, and the PL reconfiguration area 35.

The PL register 31 is used by the PS section 2 to input data that is predetermined between the PS section 2 and the PL section 3 when the PS section 2 exchanges data with the PL section 3.

The PL detector 32 detects whether access from outside the semiconductor device 1 is unauthorized access by referring to the PS unauthorized access detection register 22. The PL detector 32 also detects whether access from the PS section 2 to the PL section 3 is unauthorized access, depending on whether the above-mentioned predetermined data is input to the PL register 31. The PL detector 32 further detects whether access from the PS section 2 to the PL section 3 is unauthorized access, depending on whether predefined data (data different from the above-mentioned predetermined data) is sent to the internal bus 4.

The PL controller 33 controls the overall operation of the PL section 3. As described above, the PL controller 33 exchanges data for testing the semiconductor device 1 and data for reconfiguring the circuit KR with the PS controller 23 in the PS section 2 via the internal bus 4. The PL controller 33 also transfers data for reconfiguring the circuit KR, which is transferred from the PS controller 23, to the PL reconfiguration unit 34. The PL controller 33 further controls the operation of the PL reconfiguration unit 34.

The PL reconfiguration unit 34 reconfigures the circuit KR in the PL reconfiguration area 35 by using data for reconfiguring the circuit KR, which is transferred from the PL controller 33.

The PL reconfiguration area 35 is an area for reconfiguring the circuit KR. The PL reconfiguration area 35 includes a plurality of resources (such as a plurality of look-up tables and a plurality of flip-flops) used for reconfiguring the circuit KR.

Here, the "circuit KR" defines the functions that the semiconductor device 1 should have, in other words, the operations that the semiconductor device 1 should perform.

Functions of Semiconductor Device 1

Figure 2:
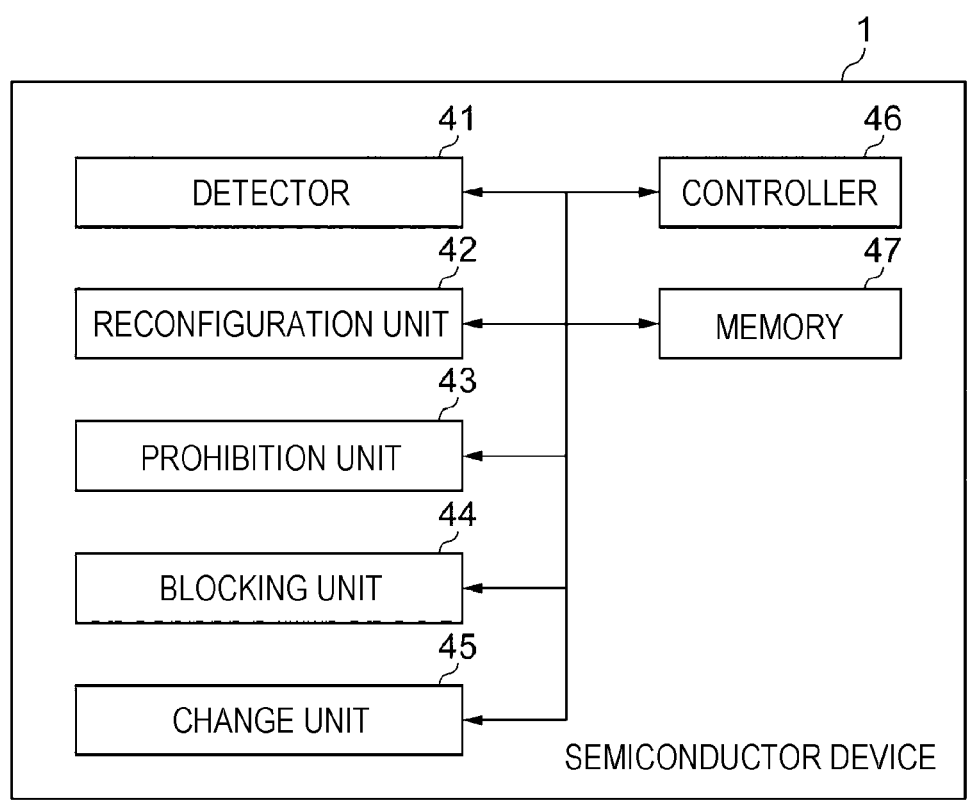
FIG. 2 is a functional block diagram of the semiconductor device of the exemplary embodiment.

FIG. 2 is a functional block diagram of the semiconductor device 1 of the exemplary embodiment.

The semiconductor device 1 of the exemplary embodiment includes, as illustrated in FIG. 2, a detector 41, a reconfiguration unit 42, a prohibition unit 43, a blocking unit 44, a change unit 45, a controller 46, and a memory 47.

The relationship between the hardware configuration and the functional configuration of the semiconductor device 1 is as follows. The PL detector 32 mainly functions as the detector 41. The PL reconfiguration unit 34 mainly functions as the reconfiguration unit 42. The PL controller 33 mainly functions as the prohibition unit 43, the blocking unit 44, and the change unit 45. The PS memory 24 mainly functions as the memory 47. The functions of the individual units will be described later.

Operation of Semiconductor Device 1

Figure 3:
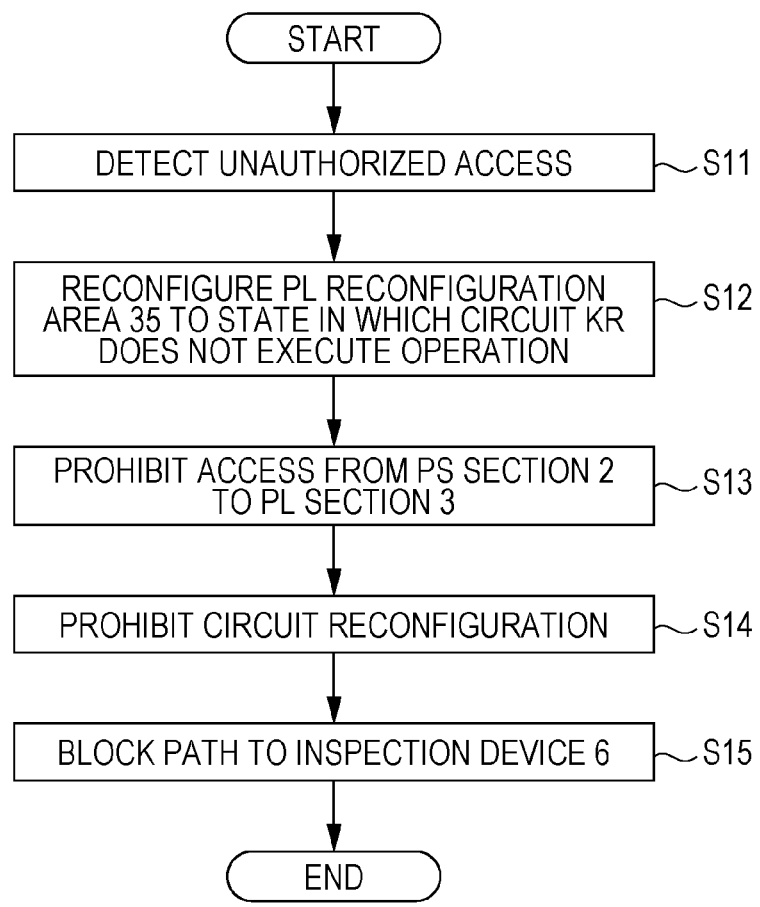
FIG. 3 is a flowchart illustrating the operation of the semiconductor device of the exemplary embodiment.

FIG. 3 is a flowchart illustrating the operation of the semiconductor device 1 of the exemplary embodiment. The operation of the semiconductor device 1 of the exemplary embodiment will be described with reference to the flowchart illustrated in FIG. 3.

Hereinafter, the following is assumed in order to facilitate the description and understanding:

(1) the PS unauthorized access detection register 22 is originally set to "no unauthorized access";
(2) the PS reconfiguration permit/prohibit register 25 is originally set to "permit reconfiguration";
(3) after the mass production of the semiconductor device 1, a third person (not illustrated) uses, for example, the inspection device 6 to gain "unauthorized access" to the semiconductor device 1 in order to perform reverse-engineering; more specifically, the third person intends to gain "unauthorized access" mentioned above and sends some kind of data to a data input terminal of the semiconductor device 1 (a terminal corresponding to a data output terminal of the inspection device 6), which is used when, for example, the designer of the semiconductor device 1 tests or inspects the semiconductor device 1, and which is the data input terminal (not illustrated) that should not be used by the purchaser (not illustrated) of the semiconductor device 1; and
(4) the circuit KR is configured in advance in the PL reconfiguration area 35.

Step S11: When the third person is accessing the semiconductor device 1 via the external bus 5A using the inspection device 6, the PS controller 23 (illustrated in FIG. 1) in the PS section 2 monitors whether the inspection device 6 is gaining "unauthorized access". As assumed above, since the inspection device 6 is gaining "unauthorized access", the PS controller 23 sets "there is unauthorized access" in the PS unauthorized access detection register 22.

In the PL section 3, the PL detector 32 (illustrated in FIG. 1) refers, as the detector 41 (illustrated in FIG. 2), to the PS unauthorized access detection register 22 in the PS section 2 periodically, for example. As described above, since the fact that "there is unauthorized access" is set in the PS unauthorized access detection register 22, the PL detector 32 detects "unauthorized access". The PL detector 32 reports that "unauthorized access" has been detected to the PL controller 33 (illustrated in FIG. 1).

Step S12: In response to detection of "unauthorized access" in step S11, under the PS reconfiguration permit/prohibit register 25 indicating "permit reconfiguration", the PL controller 33 in the PL section 3 obtains the empty data KD1 from the PS memory 24 (illustrated in FIG. 1) or obtains the empty data KD2 from the storage device 7 (illustrated in FIG. 1) in order to allow the PL reconfiguration area 35 (illustrated in FIG. 1) to enter a state in which the circuit KR does not perform its operation.

Here, "empty data" refers to data for allowing the PL reconfiguration area 35 to enter a state in which the circuit KR does not perform the operation of the circuit KR. "Empty data" refers to, for example, data for allowing the PL reconfiguration area 35 to enter a state in which the circuit KR is not present, or data for allowing the PL reconfiguration area 35 to enter a state in which it is defined that the circuit KR performs nothing.

Upon obtaining the empty data KD1 or the empty data KD2, the PL controller 33 transfers the empty data KD1 or the empty data KD2 to the PL reconfiguration unit 34 (illustrated in FIG. 1).

On receipt of the empty data KD1 or the empty data KD2, the PL reconfiguration unit 34 writes, as the reconfiguration unit 42 (illustrated in FIG. 2), the empty data KD1 or the empty data KD2 in the PL reconfiguration area 35. Accordingly, the PL reconfiguration unit 34 reconfigures the PL reconfiguration area 35 to a state in which the circuit KR does not execute its operation.

Step S13: When the PL reconfiguration area 35 is reconfigured in step S12 to a state in which the circuit KR does not execute its operation, the PL controller 33 continues to reset the PS reconfiguration permit/prohibit register 25. With the reset continued as mentioned above, the PS reconfiguration permit/prohibit register 25 maintains the state "prohibit reconfiguration". As a result, the PS section 2 is prohibited from reconfiguring the PL section 3, that is, accessing the PL section 3.

Step S14: When the PS section 2 is prohibited from accessing the PL section 3 in step S13, the PL controller 33 sets the PL reconfiguration unit 34 to the state "disabled". Accordingly, the PL controller 33 prohibits the PL reconfiguration unit 34 from reconfiguring some kind of circuit (not illustrated) in the PL reconfiguration area 35, which is in a state in which the above-mentioned circuit KR does not execute its operation. With this prohibition, the above-described situation where the PL reconfiguration unit 34 repeatedly allows the PL reconfiguration area 35 to enter a state in which the circuit KR performs nothing is avoided.

Step S15: When "circuit reconfiguration" by the PL reconfiguration unit 34 is prohibited in step S14, the PL controller 33 reports, as the blocking unit 44 (illustrated in FIG. 2), to the PS controller 23 instructions to block a path between the inspection device 6 and the PS section 2, that is, a path with a possibility of being used for possible subsequent "unauthorized access". Specifically, the PL controller 33 reports to the PS controller 23 instructions to block the above-mentioned data input terminal of the semiconductor device 1 connected to the above-mentioned data output terminal of the inspection device 6, which is connected to the external bus 5A.

On receipt of the above-mentioned instructions from the PL controller 33, the PS controller 23 sets the above-mentioned path, more specifically, the data input terminal of the semiconductor device 1, to the state "disabled". Accordingly, the PS controller 23 blocks the path between the inspection device 6 and the PS section 2.

Steps S13 and S14 described above are emergency measures, whereas step S15 described above is a permanent measure.

Step S15 and thereafter: The PL controller 33 requests a higher system (not illustrated) to reactivate the semiconductor device 1. In response to the request for reactivation, the higher system reactivates the semiconductor device 1. Accordingly, in the semiconductor device 1, while the above-mentioned data input terminal of the semiconductor device 1 remains in the state "disabled", in other words, while the path between the inspection device 6 and the semiconductor device 1 remains blocked, the circuit KR is newly reconfigured in the PL reconfiguration area 35 that had been in a state in which the circuit KR does not execute its operation, while disabling unauthorized access similar to unauthorized access from the inspection device 6 via the data input terminal of the semiconductor device 1, which is described above.

First Modification of Exemplary Embodiment

Figure 4:
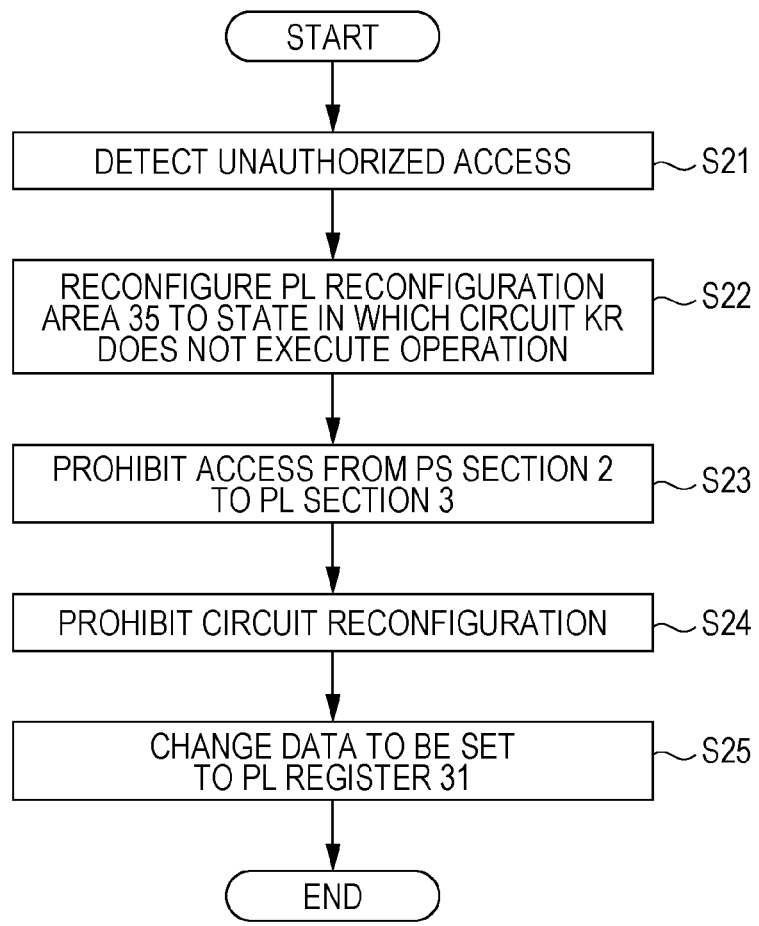
FIG. 4 is a flowchart illustrating the operation of a semiconductor device of a first modification.

FIG. 4 is a flowchart illustrating the operation of the semiconductor device 1 of a first modification. The operation of the semiconductor device 1 of the first modification will be described with reference to the flowchart illustrated in FIG. 4.

Figure 5:
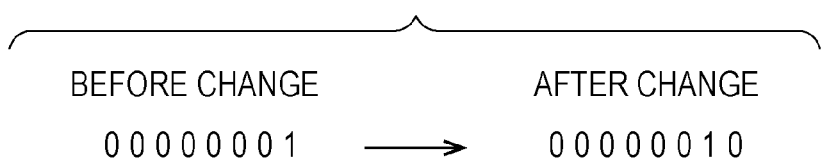
FIG. 5 illustrates data to be set to a PL register in the semiconductor device of the first modification.

Hereinafter, the following is assumed in order to facilitate the description and understanding:

(1) in order for the PS section 2 to access the PL section 3, as illustrated in FIG. 5, it is necessary to set predefined data, that is, the correct data (before change) "00000001", in the PL register 31 (illustrated in FIG. 1); hereinafter, the correct data will be referred to as "true data"; and "true data" is an example of the contents of terms to be observed for access to be recognized as authorized access and not as "unauthorized access";

(2) the PS reconfiguration permit/prohibit register 25 is originally set to "permit reconfiguration";

(3) like the above-described exemplary embodiment, after the mass production of the semiconductor device 1, in order for a third person (not illustrated) to perform reverse-engineering, when the PS controller 23 (illustrated in FIG. 1) in the PS section 2 accesses the PL controller 33 (illustrated in FIG. 1) in the PL section 3, the PS controller 23 sets wrong data other than the correct data (before change) "00000001" illustrated in FIG. 5, such as "10000000", in the PL register 31; and hereinafter, the wrong data will be referred to as "fake data"; and (4) the circuit KR is configured in advance in the PL reconfiguration area 35.

Step S21: Under reverse-engineering performed by the above-mentioned third person, when the PS controller 23 in the PS section 2 tries to access the PL controller 33 in the PL section 3, the PS controller 23 writes, that is, sets, the fake data "10000000" in the PL register 31, as assumed above.

In the PL section 3, the PL detector 32 (illustrated in FIG. 1) refers, as the detector 41 (illustrated in FIG. 2), to the PL register 31 periodically, for example. As described above, since the fake data "10000000" is set in the PL register 31, the PL detector 32 detects "unauthorized access". The PL detector 32 reports that "unauthorized access" has been detected to the PL controller 33.

Step S22: In response to detection of "unauthorized access" in step S21, like step S12 in the exemplary embodiment, under the PS reconfiguration permit/prohibit register 25 indicating "permit reconfiguration", the PL controller 33 obtains the empty data KD1 from the PS memory (illustrated in FIG. 1) or obtains the empty data KD2 from the storage device 7 (illustrated in FIG. 1) in order to allow the PL reconfiguration area 35 (illustrated in FIG. 1) to enter a state in which the circuit KR does not execute its operation.

Like step S12 in the exemplary embodiment, the PL controller 33 transfers the obtained empty data KD1 or empty data KD2 to the PL reconfiguration unit 34 (illustrated in FIG. 1).

On receipt of the empty data KD1 or the empty data KD2, like step S12 in the exemplary embodiment, the PL reconfiguration unit 34 writes, as the reconfiguration unit (illustrated in FIG. 2), the empty data KD1 or the empty data KD2 in the PL reconfiguration area 35. Accordingly, the PL reconfiguration unit 34 reconfigures the PL reconfiguration area 35 to a state in which the circuit KR does not execute its operation.

Step S23: When the PL reconfiguration area 35 is reconfigured in step S22 to a state in which the circuit KR does not execute its operation, like step S13 in the exemplary embodiment, the PL controller 33 continues to reset the PS reconfiguration permit/prohibit register 25. With the reset continued as mentioned above, the PS reconfiguration permit/prohibit register 25 maintains the state "prohibit reconfiguration". As a result, the PS section 2 is prohibited from reconfiguring the PL section 3, that is, accessing the PL section 3.

Step S24: When the PS section 2 is prohibited from accessing the PL section 3 in step S23, like step S14 in the exemplary embodiment, the PL controller 33 sets the PL reconfiguration unit 34 to the state "disabled". Accordingly, the PL controller 33 prohibits the PL reconfiguration unit 34 from reconfiguring some kind of circuit (not illustrated) in the PL reconfiguration area 35, which is in a state in which the above-mentioned circuit KR does not execute its operation.

Step S25: When "circuit reconfiguration" by the PL reconfiguration unit 34 is prohibited in step S24, unlike step S15 in the exemplary embodiment, the PL controller 33 changes, as the change unit 45 (illustrated in FIG. 2), the true data (before change) "00000001" to the true data (after change) "00000010", as illustrated in FIG. 5.

Step S25 and thereafter: Like step S15 in the exemplary embodiment, the semiconductor device 1 is reactivated. Accordingly, in the semiconductor device 1, while the true data (after change) "00000010" remains as it is, the circuit KR is newly reconfigured in the PL reconfiguration area 35 that had been in a state in which the circuit KR does not execute its operation, while disabling unauthorized access similar to unauthorized access from the PS section 2 to the PL section 3 using the fake data "10000000", which is described above.

Second Modification of Exemplary Embodiment

Figure 6:
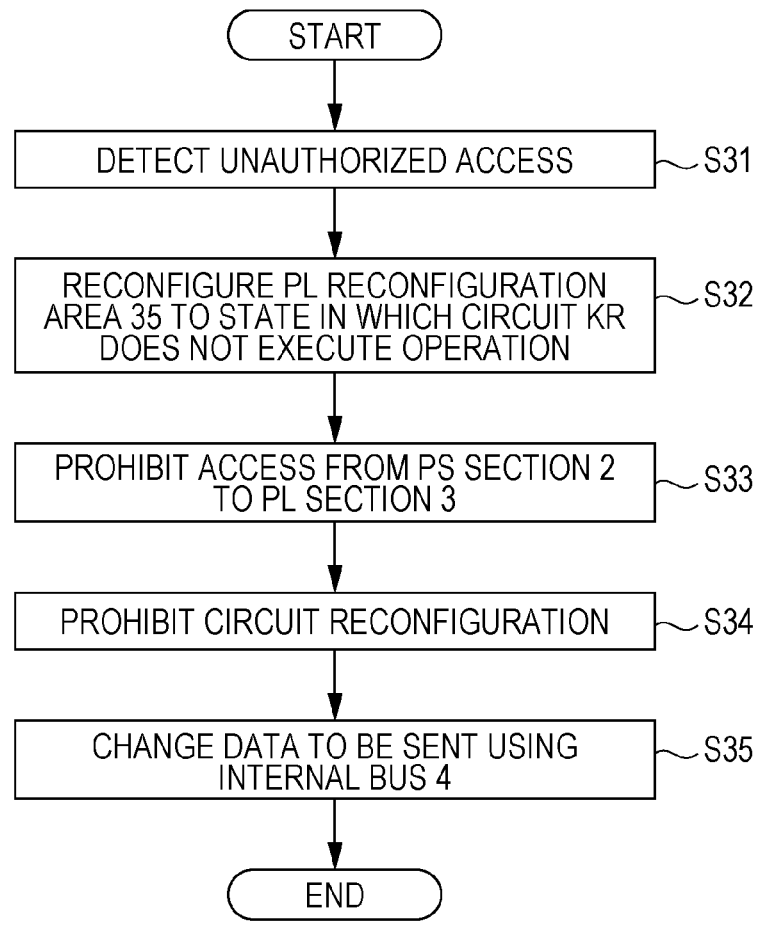
FIG. 6 is a flowchart illustrating the operation of a semiconductor device of a second modification.

FIG. 6 is a flowchart illustrating the operation of the semiconductor device 1 of a second modification. The operation of the semiconductor device 1 of the second modification will be described with reference to the flowchart illustrated in FIG. 6.

Figure 7:
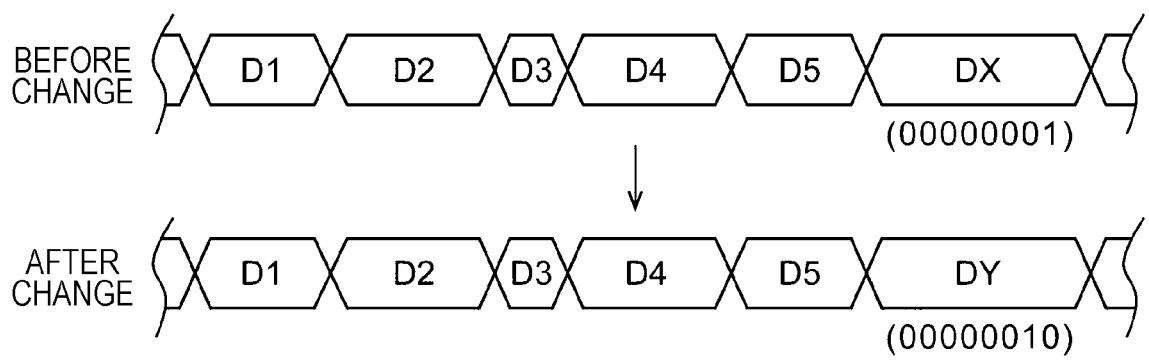
FIG. 7 illustrates data to be sent using an internal bus of the semiconductor device of the second modification.

Hereinafter, the following is assumed in order to facilitate the description and understanding:

(1) in order for the PS section 2 to access the PL section 3, as illustrated in FIG. 7, it is necessary to send the data DX (before change) "00000001" at the end of data D1, D2, . . . to be sent by the PS section 2 via the internal bus 4; hereinafter, the data DX and data DY (described later) to be sent at the end of data D1, D2, . . . will be referred to as "true data"; and the "true data" is, like the "true data" in the first modification, an example of the contents of terms to be observed for access to be recognized as authorized access and not as "unauthorized access";

(2) the PS reconfiguration permit/prohibit register 25 is originally set to "permit reconfiguration";

(3) like the exemplary embodiment, in order for a third person to perform reverse-engineering, when the PS controller 23 (illustrated in FIG. 1) in the PS section 2 accesses the PL controller 33 (illustrated in FIG. 1) in the PL section 3, the PS controller 23 sets wrong data other than the true data "00000001", such as "10000000", at the end of data D1, D2, . . . ; and hereinafter, the wrong data "10000000" will be referred to as "fake data"; and (4) the circuit KR is configured in advance in the PL reconfiguration area 35.

Step S31: Under reverse-engineering performed by the above-mentioned third person, when the PS controller 23 in the PS section 2 tries to access the PL controller 33 in the PL section 3 via the internal bus 4, the PS controller 23 sends the fake data "10000000" at the end of data D1, D2, . . . , as assumed above.

In the PL section 3, the PL detector 32 (illustrated in FIG. 1) refers, as the detector 41 (illustrated in FIG. 2), to the internal bus 4 periodically, for example. As described above, since the fake data "10000000" is sent at the end of data D1, D2, . . . , the PL detector 32 detects "unauthorized access". The PL detector 32 reports that "unauthorized access" has been detected to the PL controller 33 (illustrated in FIG. 1).

Step S32: In response to detection of "unauthorized access" in step S31, like step S12 in the exemplary embodiment, under the PS reconfiguration permit/prohibit register 25 indicating "permit reconfiguration", the PL controller 33 obtains the empty data KD1 from the PS memory (illustrated in FIG. 1) or obtains the empty data KD2 from the storage device 7 (illustrated in FIG. 1) in order to allow the PL reconfiguration area 35 (illustrated in FIG. 1) to enter a state in which the circuit KR does not execute its operation.

Like step S12 in the exemplary embodiment, the PL controller 33 transfers the obtained empty data KD1 or empty data KD2 to the PL reconfiguration unit 34 (illustrated in FIG. 1).

On receipt of the empty data KD1 or the empty data KD2, like step S12 in the exemplary embodiment, the PL reconfiguration unit 34 writes, as the reconfiguration unit (illustrated in FIG. 2), the empty data KD1 or the empty data KD2 in the PL reconfiguration area 35. Accordingly, the PL reconfiguration unit 34 reconfigures the PL reconfiguration area 35 to a state in which the circuit KR does not execute its operation.

Step S33: When the PL reconfiguration area 35 is reconfigured in step S32 to a state in which the circuit KR does not execute its operation, like step S13 in the exemplary embodiment, the PL controller 33 continues to reset the PS reconfiguration permit/prohibit register 25. With the reset continued as mentioned above, the PS reconfiguration permit/prohibit register 25 maintains the state "prohibit reconfiguration". As a result, the PS section 2 is prohibited from reconfiguring the PL section 3, that is, accessing the PL section 3.

Step S34: When the PS section 2 is prohibited from accessing the PL section 3 in step S33, like step S14 in the exemplary embodiment, the PL controller 33 sets the PL reconfiguration unit 34 to the state "disabled". Accordingly, the PL controller 33 prohibits the PL reconfiguration unit 34 from reconfiguring some kind of circuit (not illustrated) in the PL reconfiguration area 35, which is in a state in which the above-mentioned circuit KR does not execute its operation.

Step S35: When "circuit reconfiguration" by the PL reconfiguration unit 34 is prohibited in step S34, unlike step S15 in the exemplary embodiment, the PL controller 33 changes, as the change unit 45 (illustrated in FIG. 2), the true data DX (before change) "00000001" to the true data DY (after change) "00000010", as illustrated in FIG. 7.

Step S35 and thereafter: Like step S15 in the exemplary embodiment, the semiconductor device 1 is reactivated. Accordingly, in the semiconductor device 1, while the true data DX (after change) "00000010" remains as it is, the circuit KR is newly reconfigured in the PL reconfiguration area 35 that had been in a state in which the circuit KR does not execute its operation, while disabling unauthorized access similar to unauthorized access from the PS section 2 to the PL section 3 using the fake data "10000000", which is described above.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A semiconductor device comprising:
    a programmable logic detector that detects unauthorized access depending on whether a predetermined data is input to a programmable logic register and depending on whether a predefined data is sent to an internal bus of the semiconductor device; and
    a programmable logic controller configured for, in response to detection of the unauthorized access by the detector, reconfiguring a reconfiguration area where a circuit that defines an operation was present to a state in which the circuit does not execute an operation based on the circuit.

2. The semiconductor device according to claim 1, wherein:
    the programmable logic controller reconfigures the reconfiguration area to, as the state in which the circuit does not execute an operation based on the circuit, one of a state in which the circuit is not present and a state in which it is defined that the circuit performs nothing.

3. The semiconductor device according to claim 2, wherein:

the programmable logic detector detects unauthorized access to the programmable logic controller configured for reconfiguring the reconfiguration area.

4. The semiconductor device according to claim 3, wherein
the programmable logic controller is further configured for, after the detection by the programmable logic detector and the reconfiguration by the programmable logic controller, prohibiting reconfiguring the circuit in the reconfiguration area.

5. The semiconductor device according to claim 4, wherein
the programmable logic controller is further configured for, after the prohibition by the programmable logic controller, blocking a path with a possibility of being used for subsequent unauthorized access to be detected by the programmable logic detector.

6. The semiconductor device according to claim 5, wherein
the programmable logic controller is further configured for, after the prohibition by the programmable logic controller, changing contents of terms to be observed for access to be recognized by the programmable logic detector as authorized access.

7. The semiconductor device according to claim 4, wherein
the programmable logic controller is further configured for, after the prohibition by the programmable logic controller, changing contents of terms to be observed for access to be recognized by the programmable logic detector as authorized access.

8. The semiconductor device according to claim 2, wherein
the programmable logic controller is further configured for, after the detection by the programmable logic detector and the reconfiguration by the programmable logic controller, prohibiting reconfiguring the circuit in the reconfiguration area.

9. The semiconductor device according to claim 8, wherein
the programmable logic controller is further configured for, after the prohibition by the programmable logic controller, blocking a path with a possibility of being used for subsequent unauthorized access to be detected by the programmable logic detector.

10. The semiconductor device according to claim 9, wherein
the programmable logic controller is further configured for, after the prohibition by the programmable logic controller, changing contents of terms to be observed for access to be recognized by the programmable logic detector as authorized access.

11. The semiconductor device according to claim 8, wherein
the programmable logic controller is further configured for, after the prohibition by the programmable logic controller, changing contents of terms to be observed for access to be recognized by the programmable logic detector as authorized access.

12. The semiconductor device according to claim 1, wherein:
the programmable logic detector detects unauthorized access to the programmable logic controller configured for reconfiguring the reconfiguration area.

13. The semiconductor device according to claim 12, wherein
the programmable logic controller is further configured for, after the detection by the programmable logic detector and the reconfiguration by the programmable logic controller, prohibiting reconfiguring the circuit in the reconfiguration area.

14. The semiconductor device according to claim 13, wherein
the programmable logic controller is further configured for, after the prohibition by the programmable logic controller, blocking a path with a possibility of being used for subsequent unauthorized access to be detected by the programmable logic detector.

15. The semiconductor device according to claim 14, wherein
the programmable logic controller is further configured for, after the prohibition by the programmable logic controller, changing contents of terms to be observed for access to be recognized by the programmable logic detector as authorized access.

16. The semiconductor device according to claim 13, wherein
the programmable logic controller is further configured for, after the prohibition by the programmable logic controller, changing contents of terms to be observed for access to be recognized by the programmable logic detector as authorized access.

17. The semiconductor device according to claim 1, wherein
the programmable logic controller is further configured for, after the detection by the programmable logic detector and the reconfiguration by the programmable logic controller, prohibiting reconfiguring the circuit in the reconfiguration area.

18. The semiconductor device according to claim 17, wherein
the programmable logic controller is further configured for, after the prohibition by the programmable logic controller, blocking a path with a possibility of being used for subsequent unauthorized access to be detected by the programmable logic detector.

19. The semiconductor device according to claim 18, wherein
the programmable logic controller is further configured for, after the prohibition by the programmable logic controller, changing contents of terms to be observed for access to be recognized by the programmable logic detector as authorized access.

20. The semiconductor device according to claim 17, wherein
the programmable logic controller is further configured for, after the prohibition by the programmable logic controller, changing contents of terms to be observed for access to be recognized by the programmable logic detector as authorized access.

* * * * *